(12) United States Patent
Kothari et al.

(10) Patent No.: US 9,654,396 B2
(45) Date of Patent: May 16, 2017

(54) CONTROLLER-LESS PEER-TO-PEER DISTRIBUTED SWITCH

(71) Applicant: Cisco Technology, Inc., San Jose, CA (US)

(72) Inventors: Pritesh Kothari, Sunnyvale, CA (US); Senhua Huang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 14/156,102

(22) Filed: Jan. 15, 2014

(65) Prior Publication Data
US 2015/0200853 A1    Jul. 16, 2015

(51) Int. Cl.
| | | |
|---|---|---|
| *H04L 12/743* | (2013.01) | |
| *H04L 12/713* | (2013.01) | |
| *H04L 12/851* | (2013.01) | |
| *H04L 29/08* | (2006.01) | |

(52) U.S. Cl.
CPC ........ *H04L 45/7453* (2013.01); *H04L 45/586* (2013.01); *H04L 47/2441* (2013.01); *H04L 67/104* (2013.01)

(58) Field of Classification Search
CPC ............. H04L 45/7453; H04L 47/2441; H04L 45/586; H04L 67/104; H04L 12/4604; H04L 67/1061
See application file for complete search history.

(56) References Cited

U.S. PATENT DOCUMENTS

| | | |
|---|---|---|
| 6,643,260 B1 | 11/2003 | Kloth et al. |
| 2001/0033548 A1 | 10/2001 | Saleh et al. |
| 2008/0291906 A1 | 11/2008 | Chigurupati et al. |
| 2009/0034557 A1 | 2/2009 | Fluhrer et al. |
| 2010/0046523 A1 | 2/2010 | Mekkatuparramban et al. |
| 2013/0070762 A1* | 3/2013 | Adams ................... H04L 49/70 370/389 |
| 2013/0195105 A1* | 8/2013 | Basso ..................... H04L 45/72 370/389 |
| 2015/0049714 A1* | 2/2015 | Ghai ..................... H04W 76/02 370/329 |
| 2016/0197831 A1* | 7/2016 | De Foy ............... H04L 45/7453 370/392 |

\* cited by examiner

*Primary Examiner* — Thai Nguyen
(74) *Attorney, Agent, or Firm* — Parker Ibrahim & Berg LLC; James M. Behmke; Stephen D. LeBarron

(57) ABSTRACT

In one embodiment, a device (e.g., a sync daemon) connects to peer nodes in a communication network. Each of the peer nodes has a switch that supports a flow table and an action table. The device facilitates a connection between a switch of a first peer node and a switch of a second peer node, and maintains the flow table and the action table of each of the peer nodes, such that the flow tables and the action tables are kept in synchronization with one another across each of the peer nodes via a distributed hash table.

17 Claims, 5 Drawing Sheets

CONTROLLER-LESS PEER-TO-PEER DISTRIBUTED SWITCH

TECHNICAL FIELD

The present disclosure relates generally to computer networks, and, more particularly, to controller-less peer-to-peer distributed switches.

BACKGROUND

In current implementations, distributed switches have ports that can be spread across hundreds of miles, and they provide a full-mesh of non-blocked connectivity between each of its ports. As a result, the configuration of distributed virtual switches can be very complex and demanding. Also, their network topology cannot be dynamically changed on-demand, and it becomes difficult to add or remove individual switches from the configuration without major network and configuration changes.

Moreover, distributed virtual switches currently need single or multiple centralized controllers to work properly. This is because in most current virtual switching implementations, the actual forwarding engine is distributed across multiple hypervisors, while the control plane is centralized, e.g., at a controller. Also, some existing dedicated control mechanisms are needed to push and/or update the configuration between the controller and the forwarding engine. Thus, if the centralized controller is down, then the system as a whole may operate in a degraded mode, or may stop functioning completely.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device (e.g., a sync daemon) connects to peer nodes in a communication network. Each of the peer nodes has a switch that supports a flow table and an action table. The device facilitates a connection between a switch of a first peer node and a switch of a second peer node, and maintains the flow table and the action table of each of the peer nodes, such that the flow tables and the action tables are kept in synchronization with one another across each of the peer nodes via a distributed hash table.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Cloud computing can be generally defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines (VMs), etc. For instance, resources may include service devices (firewalls, deep packet inspectors, traffic monitors, etc.), processing devices (brute force processing capability), storage devices (e.g., servers, network attached storages, storage area network devices), etc., and may be used for instantiation of VMs, databases, applications (Apps), etc.

Additionally, a virtual switch is an application, e.g., software program, that allows one VM to communicate with another. Similar to a physical switch, e.g., an Ethernet switch, a virtual switch can intelligently direct communication on the network by inspecting incoming packets before passing them on. A virtual switch may be embedded into virtualization software, or in the alternative, be included in a server's hardware as part of the firmware. Meanwhile, a distributed virtual switch (DVS) is an abstract representation of multiple peers, hosts, or the like, defining the same name, network policy, and port group. The representation, in part, allows for configuration details to be pushed across a cluster, which advantageously helps to eliminate common configuration errors. The DVS may operate in a hypervisor, as described below, and can be distributed across multiple hosts.

Figure 1:
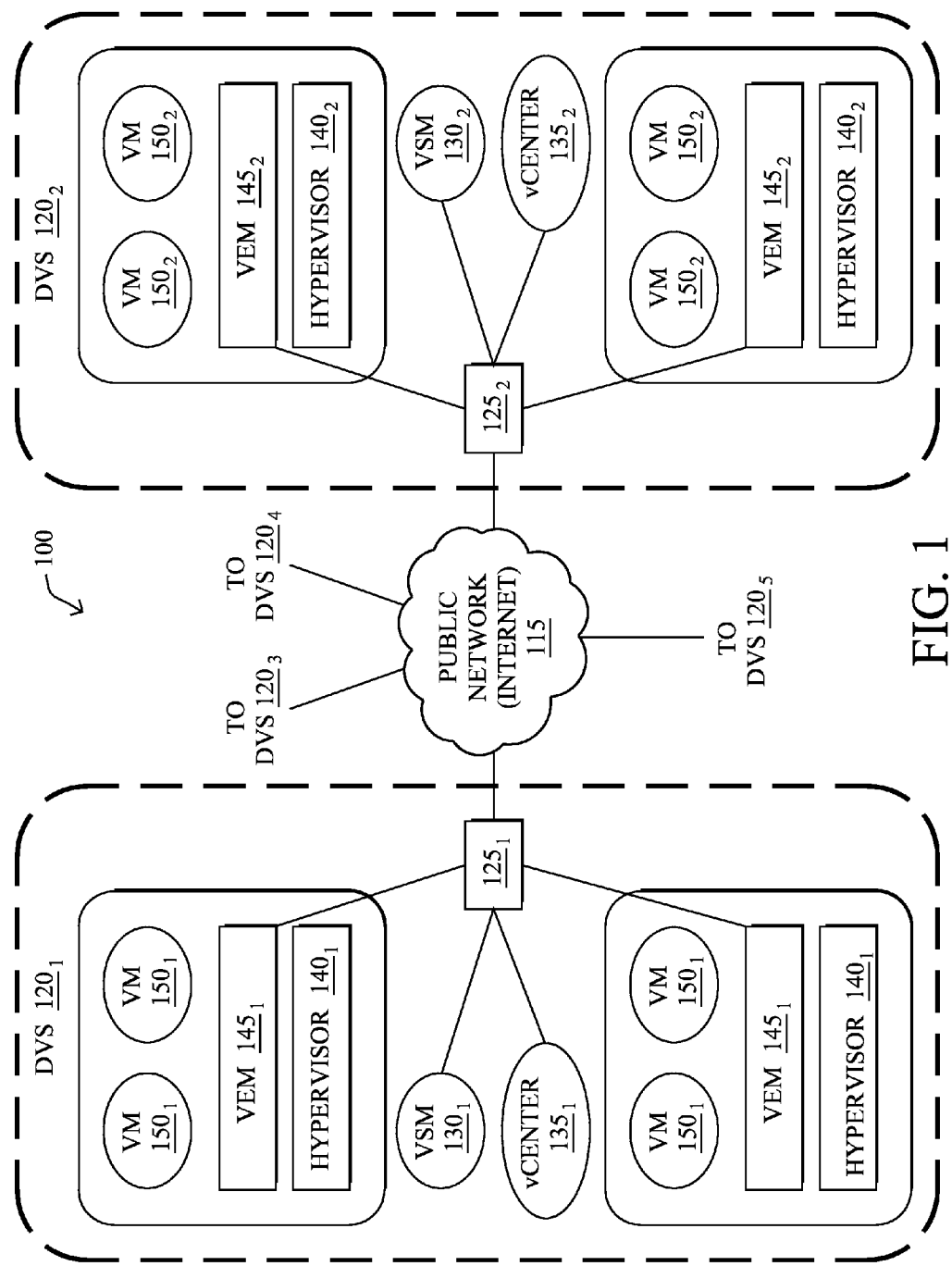
FIG. 1 illustrates an example communication network.

FIG. 1 illustrates an example communication network 100 illustratively comprising a public network 115, such as the Internet. At least one DVS, e.g., $120_1$, $120_2$, $120_3$, $120_4$ and $120_5$ (hereinafter "120" for simplification), may be connected to the public network 115 via a suitable communication link, e.g., switch 125 (described further below). As is known in the art, a virtual switch that is connected to an uplink adapter can access the external network through that uplink. The adapter can be an uplink connected to a standard switch or a distributed uplink port connected to a distributed switch.

As a result, a connection between each of the DVSes may be established through the public network 115. Data packets/traffic may be exchanged among the DVSes, e.g., via switch 125, using predefined network communication protocols as will be understood by those skilled in the art. Those skilled in the art will understand that any number of computing resources, devices, links, etc. may be used in network 100, and that the view shown herein is for simplicity.

As detailed in FIG. 1, a DVS 120 may be composed of a switch 125 (physical or virtual) configured with a virtual supervisor module (VSM) 130 and virtualization platform ("vCenter") 135, as may be appreciated by those skilled in the art. In particular, as will also be understood by those skilled in the art, the DVS 120 may comprise one or more embedded hypervisors 140, also called virtual machine managers (VMMs), that may each consist of a virtual Ethernet module (VEM) 145 and one or more VMs 150. The remaining illustrative DVSes, e.g., $120_2$, $120_3$, $120_4$ and $120_5$, may be configured in a similar manner as the configuration described above with respect to DVS 120; however, as will be understood by those skilled in the art, the illustrative configuration of DVS 120 is merely for simplicity purposes only, and in an actual implementation, any of the DVSes connected to the network 115 may be configured with any suitable arrangement of links, modules, machines, etc. therein.

As noted above, in current implementations, DVSes have ports that can be spread across hundreds of miles, and they provide a full-mesh of non-blocked connectivity between each of its ports. As a result, the configuration of DVSes can generally be very complex and demanding. Also, their network topology cannot generally be dynamically changed on-demand, and it becomes difficult to add or remove individual switches from the configuration without major network and configuration changes.

Moreover, DVSes conventionally need single or multiple centralized controllers to work properly. This is because in most current virtual switching implementations, the actual forwarding engine is distributed across multiple hypervisors, while the control plane is centralized, e.g., at a controller. Also, some dedicated control mechanisms are typically needed to push and/or update the configuration between the controller and the forwarding engine. Thus, if the centralized controller is down, then the system as a whole may operate in a degraded mode, or may stop functioning completely.

Controller-Less Peer-to-Peer Distributed Virtual Switch

The techniques herein provide a complete peer-to-peer DVS with peer discovery mechanism, which works across multiple service providers and multiple virtual switches. Within this construct, the exchange of control information, e.g., state updates, may be distributed from one peer device to another via a peer-to-peer protocol. Consequently, the controller-less peer-to-peer DVS, as described herein, may have distributed data forwarding engines across a number of hosts, e.g., "peers."

Specifically, according to one or more embodiments of the disclosure as described in detail below, a device (e.g., a sync daemon) connects to peer nodes in a communication network. Each of the peer nodes has a switch that supports a flow table and an action table. The device facilitates a connection between a switch of a first peer node and a switch of a second peer node, and maintains the flow table and the action table of each of the peer nodes, such that the flow tables and the action tables are kept in synchronization with one another across each of the peer nodes via a distributed hash table.

Illustratively, the techniques described herein may be performed by hardware, software, and/or firmware, or may be executed via computer executable instructions executed by a processor of one or more devices associated with the DVS to perform functions relating to the techniques described herein. For example, the techniques herein may be treated as extensions to existing peer-to-peer protocols, and as such, may be processed by similar components and devices understood in the art that execute those protocols, accordingly.

Operationally, the disclosed embodiments comprise various components. For example, a switch (virtual or real) supporting flow tables and action tables is disclosed. Further, a distributed mechanism for synchronizing the flow and action tables is disclosed. Even further, the techniques, accessories, protocols, and the like, by which the mechanism may operate are disclosed.

Figure 2:
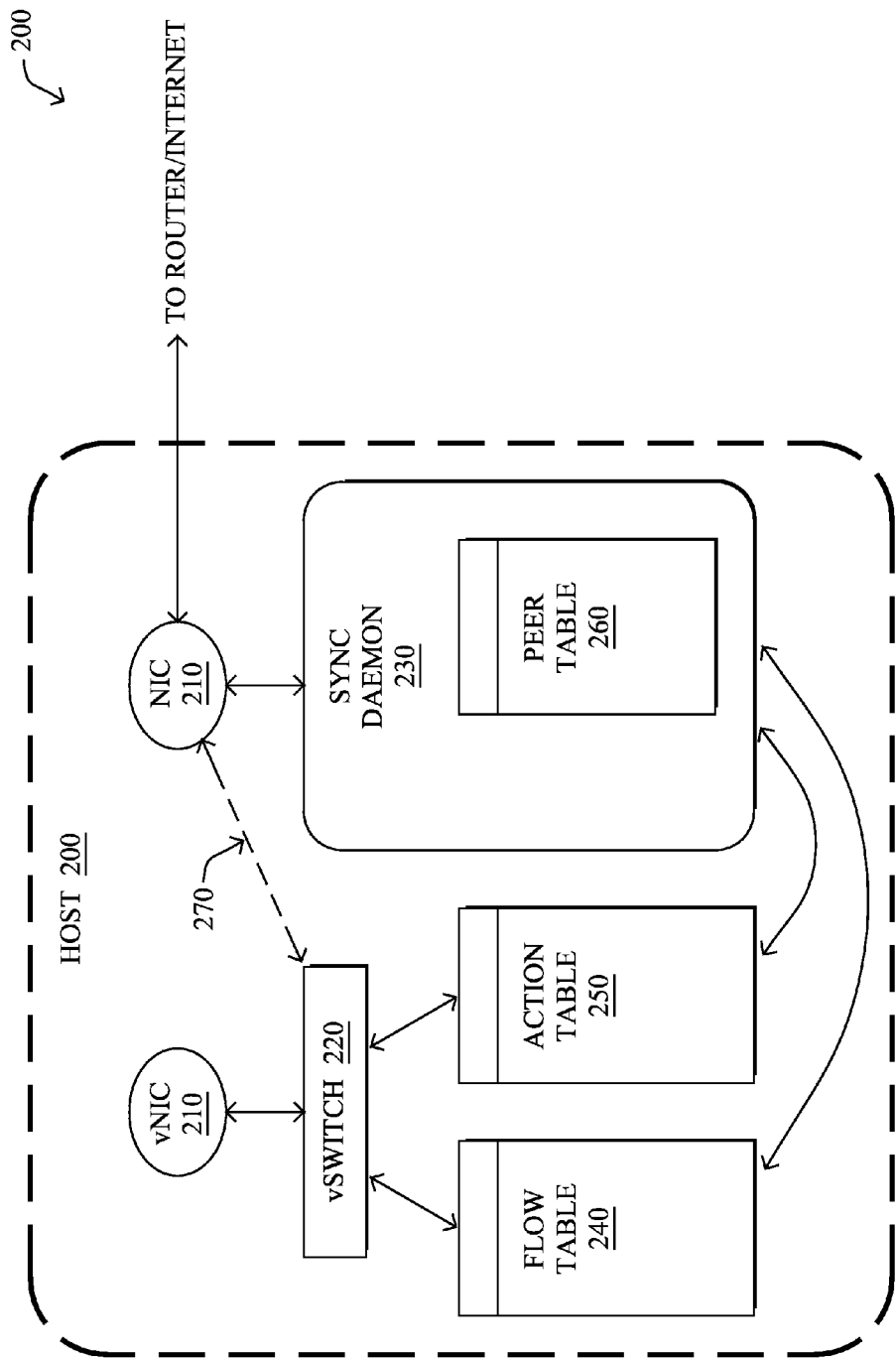
FIG. 2 illustrates an example controller-less peer-to-peer distributed switch including a sync daemon for synchronizing the switch-supported flow and action tables.

FIG. 2 illustrates an example controller-less peer-to-peer distributed virtual switch including a sync daemon for synchronizing the switch-supported flow and action tables. As shown in FIG. 2, the host 200 may include a network interface controller (NIC) 210, a switch 220, and a sync daemon 230.

For the purposes of the present disclosure, the host 200 may be referred to as a "peer" or "peer node." Any number of hosts/peers may be present in a communication network. The host 200 may include a switch 220 that supports a flow table 240 and action table 250, as described further below. The host 200 may be connected to a sync daemon 230 that may include a peer table 260, as described further below. Moreover, the host 200 may include one or more NICs 210 for connecting the host 200 to an external entity, including, for example, a forwarding device (e.g., router, switch, etc.), the Internet, or the like. The one or more NIC 210 may include a generic NIC, a virtual NIC in conjunction with a virtual switch 220, or a combination of the above.

The switch 220 may be a generic switch for routing data packets in the network. The switch 220 may preferably be a virtual switch; however, the switch 220 may alternatively be a real, e.g., physical, switch. The switch 220 may be connected to one or more NICs 210, including, for example, a virtual NIC ("vNIC") or an NIC via an overlay network connection (e.g., arrow "270" in FIG. 2). The switch 220 may be operable to communicate with a second peer node in the network, or more particularly, a switch of the second peer node. In this regard, the switch 220 may establish a secure communication link, e.g., secure data path tunnel, between itself and the switch of the second peer node. Moreover, the switch 220 may support actions and flows. In other words, the switch 220 may support a flow table 240 and an action table 250.

Figure 4:
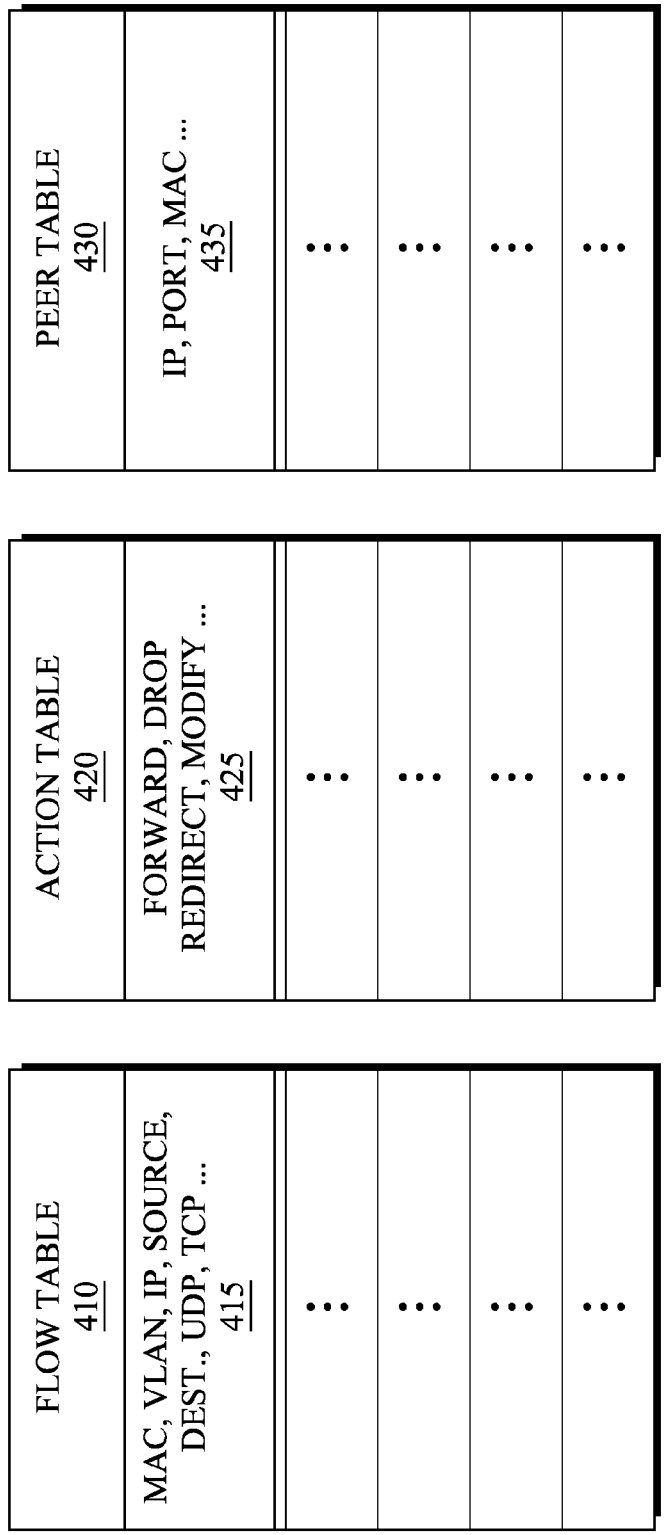
FIG. 4 illustrates example data tables for use in the disclosed embodiments.

The flow table 240 may be used by the switch 220 to detect and match a flow specified in the table with the real incoming flows in the system. The flow table 240 may contain a list of flow entries, and each flow entry may contain a match field that defines the flow, as illustrated in FIG. 4. Each entry of the flow table 240 may define a packet flow, and the switch 220 may examine an incoming packet flow to determine whether it matches a defined packet flow of the flow table 240. For example, a typical flow table entry may include multiple fields or parameters, such as, a media access control (MAC) address, a Virtual Local Area Network (VLAN) value, an Internet Protocol (IP) address, a source address, a destination address, a User Datagram Protocol (UDP) attribute, a Transmission Control Protocol (TCP) attribute, and so forth. The switch 220 may then receive a data packet, examine the contents of the packet, and detect whether the contents match any of the fields/parameters defined in the flow table 240. It should be noted that the above listed values are merely for illustration purposes only and do not represent an exhaustive list. Additional information may be included in the flow table entries, including, for example, a counter to track events, such as a match, a new/unrecognized flow, etc., a set of instructions corresponding to a particular flow (either in addition to, or instead of, storing actions in the action table 250), and so forth.

The action table 250 may define a packet action, or in other words, instructions for the switch 220 in response to a particular packet flow. The packet actions in the action table 250 may refer to any action the switch 220 may take with respect to a received packet, including, for example, forwarding the packet to a particular destination, dropping the packet, redirecting the packet, adding information (e.g., identifier, time-to-live (TTL) value, etc.) to the packet, and so forth. Moreover, each entry of the flow table 240 may have one or more corresponding entries in the action table 250. Thus, when the switch 220 detects a match in the flow table 240, the switch may apply the actions specified in action table 250 which correspond to the detected packet flow.

The sync daemon 230 may be connected to the NIC 210. Also, the sync daemon 230 may operate in conjunction with the switch 220. Importantly, the sync daemon 230 may keep the flow table 240 and the action table 250 in synchronization with one another. The sync daemon 230 may use a distributed hash table (DHT) to synchronize the flow table 240 and the action table 250. As is understood in the art, the DHT provides lookup functionality similar to that of a standard hash table, but functions as a decentralized, distributed system. DHT has been used in a myriad of applications, such as file systems, peer-to-peer file transfer, and so forth, but notably, it has not previously been used in the virtual switching environment. Also, any suitable DHT protocol or implementation may be utilized with the techniques herein. Moreover, the sync daemon 230 may maintain the flow table 240 and the action table 250 of all peer nodes in the network, such that the flow tables and the action tables are kept in synchronization with one another across all peer nodes.

Figure 3:
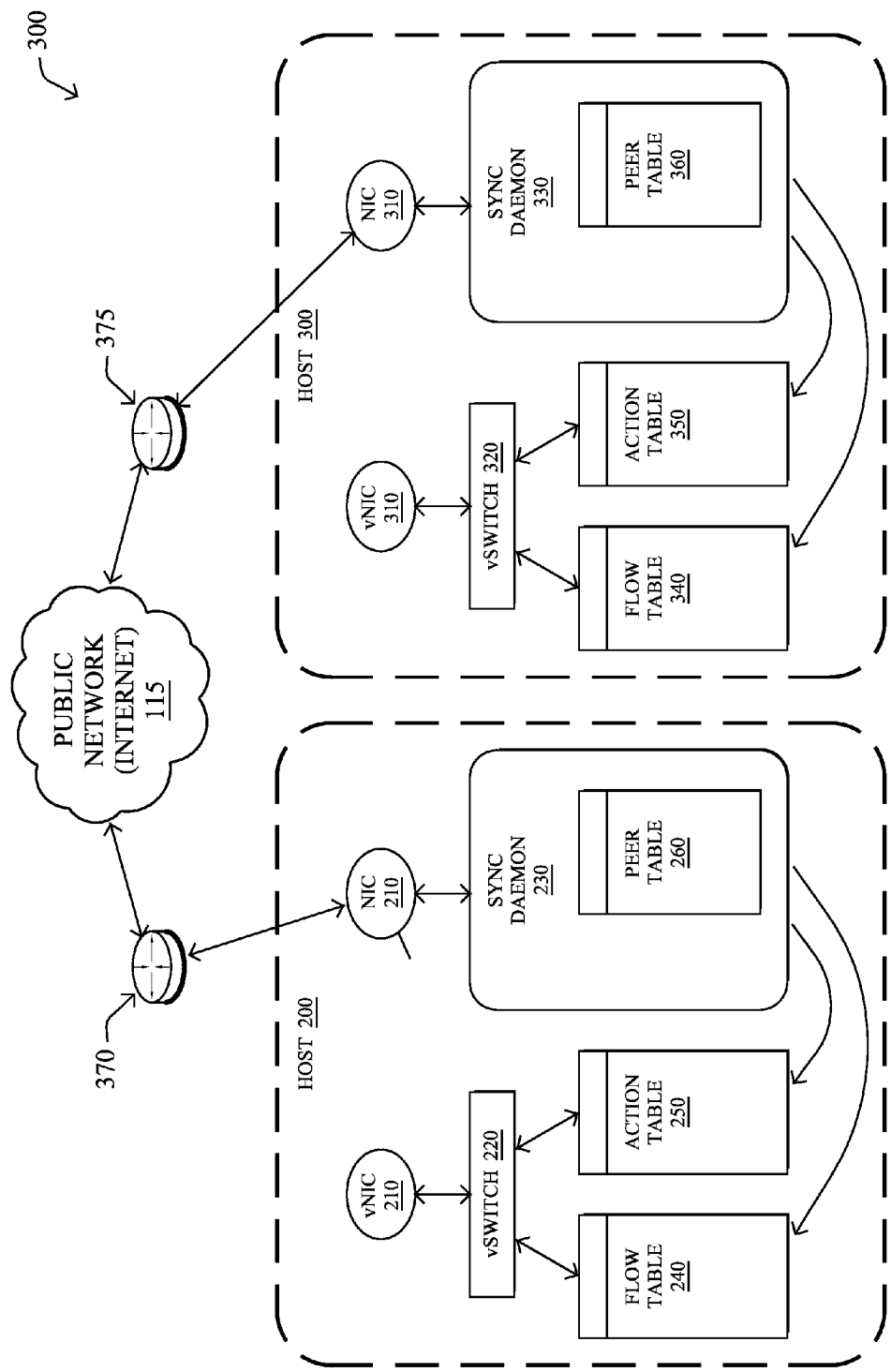
FIG. 3 illustrates an example network including multiple controller-less peer-to-peer distributed switches.

The sync daemon 230 may keep track of the peer nodes throughout the network, as illustrated further in FIGS. 3 and 4. To do so, the sync daemon 230 may include a peer table 260 for maintaining a record of each connected peer node in the network. Entries in the peer table 260 may include fields/parameters used to identify a particular peer, including, for example, an IP address, a port number, a MAC address, and the like.

FIG. 3 illustrates an example network including multiple controller-less peer-to-peer distributed switches. As shown in FIG. 3, the communication network 390 may include multiple peers 200 and 300 connected to the Internet 115 via forwarding devices 370 and 375.

The peer node 300 may be illustratively configured in the same manner as the peer node 200. Thus, peer node 300 may include at least one NIC 310, a switch 320, which may be virtual or physical, and which supports a flow table 340 and an action table 350, a sync daemon 330 which keeps the flow table and action table synchronized with one another, and which contains a peer table 360. It should be understood that while peer nodes 200 and 300 are shown in FIG. 3, any number of hosts/peers may be present in the communication network 390, and the peer nodes 200 and 300 may be configured in any suitable manner so as to include a switch supporting a flow table and an action table, and a sync daemon to synchronize the flow table and the action table.

The peer nodes 200 and 300 may connect to a public network 115, e.g., the Internet, via forwarding devices 370 and 375, respectively. The connection may be facilitated by the sync daemons 230 and 330, whereby the sync daemon may be configured to establish a communication link between each of the peer nodes 200 and 300 and a corresponding forwarding node 370 and 375, respectively. The forwarding devices 370 and 375 may be routers, for example, and may be considered edge devices within the topology of the network 390. The sync daemons 230 and 330 may establish the communication link using a suitable networking protocol, such as, for example, a protocol related to Network Address Translation-Port Mapping Protocol (NAT-PMP) or Universal Plug and Play (UPnP). In this manner, the communication link established by the sync daemons 230 and 330 may allow for network address translation (NAT) traversal or port forwarding to/from the edge router 370 and 375, respectively. The protocol used by a first peer node to communicate with a first router may differ than a protocol used by a second peer node to communicate with a second router in the same network.

As explained above, the sync daemons 230 and 330 may connect to various peer nodes 200 and 300 in the network 390. The peer nodes to which the sync daemons 230 and 330 are connected may be recorded in the respective peer table 260 and 360, respectively. Moreover, in the case that a sync daemon is connected to only a single peer node, the sync daemon may wait to maintain the flow table and the action table of the single peer node until another peer node has connected to the single peer node.

Moreover, the sync daemons 230 and 330 may facilitate a connection between a switch of a first peer node and a switch of a second peer node. Illustratively, the sync daemon 230 of the peer node 200 may establish a connection to a different peer node 300, e.g., via the Internet, such that the switch 220 may connect to the switch 320. As a result, a secure data path tunnel may be established between the peer switches.

FIG. 4 illustrates example data tables for use in the disclosed embodiments. As shown in FIG. 4, the data tables for use in the disclosed embodiments may include, for example, a flow table 410, an action table 420, and a peer table 430. Each of the illustrated data tables may be supported and maintained by one or more of a switch (virtual or physical) and a sync daemon, as described above.

The flow table 410 may be supported by the switch and used by the switch to detect and match a flow specified in the table with the real incoming flows in the network. The flow table 410 may contain a list of flow entries 415, and each flow entry may contain a match field that defines the flow. For example, as illustrated in FIG. 3, data in a particular flow entry 415 may pertain to one or more of, for example, a MAC address, a VLAN value, an IP address, a source address, a destination address, a UDP attribute, a TCP attribute, and so forth.

The action table 420 may also be supported by the switch and used by the switch to perform an action in the network in response to a particular packet flow. The action table 420 may contain a list of action entries 415, and each action entry may contain an action the switch may take with respect to a received packet. For example, as illustrated in FIG. 3, data in a particular action entry 415 may pertain to one or more of, for example, forwarding the packet to a particular destination, dropping the packet, redirecting the packet, modifying the packet (e.g., adding an identifier, time-to-live (TTL) value, etc.), and so forth. Furthermore, each entry of the flow table 410 may have one or more corresponding entries 425 in the action table 420. Thus, when the switch detects a match in the flow table 410, the switch may apply the action(s) specified in action table 420 which corresponds to the detected packet flow. Even further, as described above, the sync daemon may maintain the flow table 410 and the action table 420 of all peer nodes, such that the flow tables and the action tables are kept in synchronization with one another across each of the peer nodes via a distributed hash table.

The peer table 430 may be supported by the sync daemon and used by the sync daemon to keep track of the peer nodes throughout the network. The peer table 430 may contain a list of peer entries 435, and each peer entry may contain a record of each connected peer node in the network. For example, as illustrated in FIG. 4, data in a particular peer entry 435 may pertain to one or more of, for example, an IP address, a port number, a MAC address, and the like, corresponding to one or more peer nodes.

Figure 5:
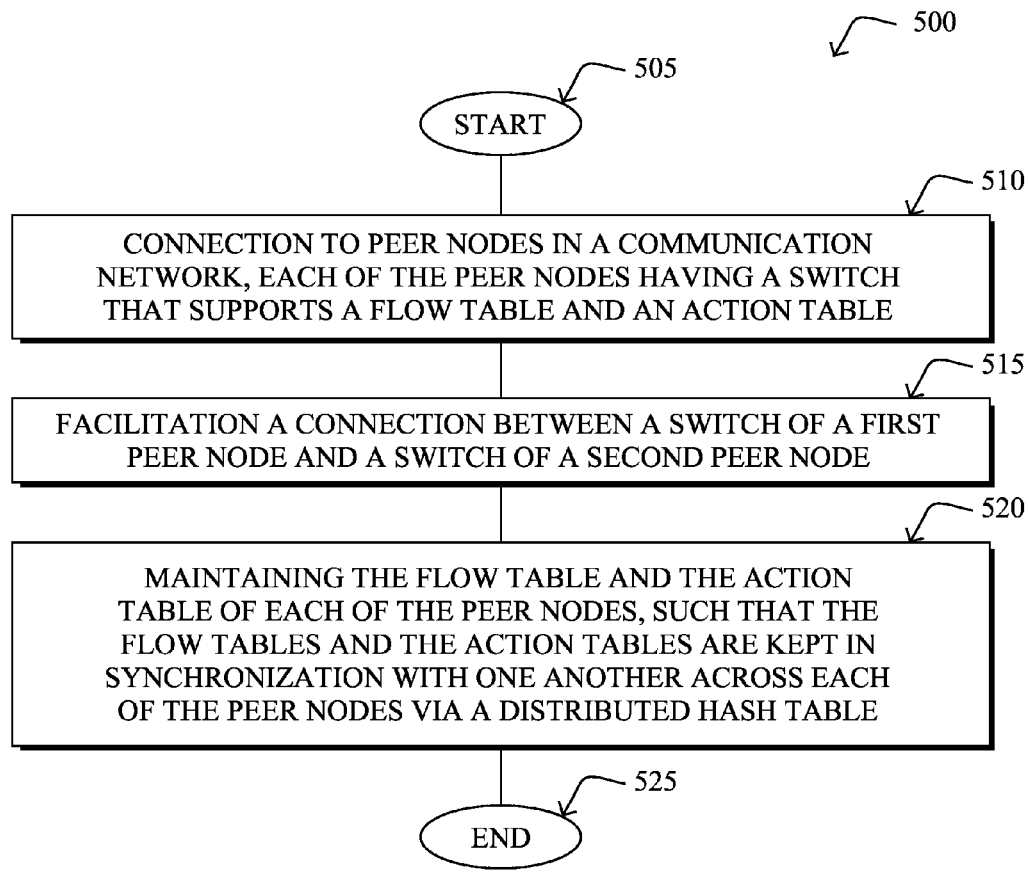
FIG. 5 illustrates an example simplified procedure for using controller-less peer-to-peer distributed switches.

FIG. 5 illustrates an example of simplified procedure for using controller-less peer-to-peer distributed switches. The procedure 500 may start at step 505, and continues to step 510, where, as described in greater detail above, a controller-less peer-to-peer distributed switch may be utilized in a communication network.

At step 510, peer nodes are connected to in a communication network. Each of the peer nodes has a switch that supports a flow table and an action table. Also, at step 515, a connection is facilitated between a switch of a first peer node and a switch of a second peer node. Further, at step 520, the flow table and the action table of each of the peer nodes are maintained, such that the flow tables and the action tables are kept in synchronization with one another across each of the peer nodes via a distributed hash table. The procedure 500 illustratively ends at step 525. The techniques, by which the steps of procedure 500 may be performed, as well as ancillary procedures and parameters, are described in detail above.

It should be noted that the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a peer-to-peer, controller-less, distributed virtual switch, which uses such a syncing mechanism. As a result, there is no single point of failure since redundancy is built in the system. Moreover, new data plane engines and switches can join/leave the system gracefully.

While there have been shown and described illustrative embodiments that provide for controller-less peer-to-peer distributed switches, it is to be understood that various other adaptations and modifications may be made within the spirit and scope of the embodiments herein. For example, the embodiments have been shown and described herein with relation to peer-to-peer networks. However, the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    facilitating, by sync daemons on peer nodes, a secure data path tunnel connection between a switch on a first peer node and a switch on a second peer node, wherein the switch on the first peer node and the switch on the second peer node each support a flow table and an action table residing on each peer node, respectively, and wherein the switch on the first peer node and the switch on the second peer node are each a distributed virtual switch, respectively; and
    upon establishing the secure data path tunnel connection, maintaining, by the sync daemons, synchronization of the flow tables and action tables across each of the peer nodes via a distributed hash table to enable switches of the peer nodes to function as a controller-less peer-to-peer distributed switch.

2. The method as in claim 1, wherein each entry of the flow table defines a packet flow, each entry of the action table defines a packet action, and each entry of the flow table has one or more corresponding entries in the action table.

3. The method as in claim 2, wherein when any one of the switches of the peer nodes detects an incoming packet flow that matches a defined packet flow of the flow table, the one switch performs a corresponding action(s) according to a defined packet action(s) of the action table.

4. The method as in claim 1, wherein
    when connected to only a single peer node, waiting to maintain the flow table and the action table until another peer node has connected to the single peer node.

5. The method as in claim 1, further comprising:
    maintaining a record of each of the peer nodes.

6. The method as in claim 5, further comprising:
    maintaining the record of each of the peer nodes via a stored peer table.

7. The method as in claim 1, further comprising:
    establishing a communication link between each of the peer nodes and a corresponding forwarding node, respectively.

8. The method as in claim 7, wherein the communication link is established using a networking protocol related to Network Address Translation-Port Mapping Protocol (NAT-PMP) or Universal Plug and Play (UPnP).

9. An apparatus, comprising:
    one or more network interfaces that communicate with a communication network;
    a processor coupled to the one or more network interfaces and configured to execute a program process including at least a sync daemon; and
    a memory configured to store program instructions which contain the program process executable by the processor, the program process comprising:
        facilitating, by the sync daemon, a secure data path tunnel connection between a switch on the apparatus and a switch on a second peer node, wherein the switch on the apparatus and the switch on the peer node each support a flow table and an action table residing on the apparatus and the peer node respectively, and wherein the switch on the apparatus and the switch on the peer node are each a distributed virtual switch, respectively; and
        upon establishing the secure data path tunnel connection, maintaining, by the sync daemon, synchronization of flow tables and action tables across each of the peer nodes via a distributed hash table to enable switches of the peer nodes to function as a controller-less peer-to-peer distributed switch.

10. The apparatus as in claim 9, wherein each entry of the flow table defines a packet flow, each entry of the action table defines a packet action, and each entry of the flow table has one or more corresponding entries in the action table.

11. The apparatus as in claim 10, wherein when any one of the switches of the peer nodes detects an incoming packet flow that matches a defined packet flow of the flow table, the one switch performs a corresponding action(s) according to a defined packet action(s) of the action table.

12. The apparatus as in claim 9, wherein
when connected to only a single peer node, waiting to maintain the flow table and the action table until another peer node has connected to the single peer node.

13. The apparatus as in claim 9, wherein the process further comprises:
maintaining a record of each of the peer nodes.

14. The apparatus as in claim 13, wherein the process further comprises:
maintaining the record of each of the peer nodes via a stored peer table.

15. The apparatus as in claim 9, wherein the process further comprises:
establishing a communication link between each of the peer nodes and a corresponding forwarding node, respectively.

16. The apparatus as in claim 15, wherein the communication link is established using a networking protocol related to Network Address Translation-Port Mapping Protocol (NAT-PMP) or Universal Plug and Play (UPnP).

17. A tangible non-transitory computer readable medium storing program instructions that cause a computer to execute a process including at least a sync daemon, the process comprising:
facilitating, by the sync daemon, a secure data path tunnel connection between a switch on the computer and a switch on a peer node, wherein the switch on the computer and the switch on the peer node each support a flow table and an action table residing on the computer and the peer node respectively, and wherein the switch on the first peer node and the switch on the second peer node are each a distributed virtual switch, respectively; and
upon establishing the secure data path tunnel connection, maintaining, by the sync daemon, synchronization of flow tables and action tables across each of the peer nodes to enable switches of the peer nodes to function as a controller-less peer-to-peer distributed switch.

* * * * *